(12) United States Patent
Tanaka et al.

(10) Patent No.: US 7,969,680 B2
(45) Date of Patent: Jun. 28, 2011

(54) MAGNETIC TAPE ON WHICH A SERVO PATTERN IS FORMED

(75) Inventors: Kenji Tanaka, Osaka (JP); Sadamu Kuse, Osaka (JP); Kenichiro Yoshida, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 149 days.

(21) Appl. No.: 12/193,981

(22) Filed: Aug. 19, 2008

(65) Prior Publication Data
US 2009/0109566 A1   Apr. 30, 2009

(30) Foreign Application Priority Data
Oct. 31, 2007  (JP) .................................. 2007-283931

(51) Int. Cl.
*G11B 5/09*   (2006.01)
(52) U.S. Cl. ....................................... 360/48; 360/77.12
(58) Field of Classification Search ........................ None
See application file for complete search history.

(56) References Cited

U.S. PATENT DOCUMENTS 6,614,607 B1* 9/2003 Rothermel et al. ............. 360/48
7,466,510 B2* 12/2008 Johnson et al. ............ 360/77.12

FOREIGN PATENT DOCUMENTS

| JP | 8-227511 A | | 9/1996 |
|---|---|---|---|
| JP | 9-91904 A | | 4/1997 |
| JP | 09091904 A | * | 4/1997 |
| JP | 2003-173508 A | | 6/2003 |
| JP | 2005-56500 A | | 3/2005 |
| JP | 2005-259198 A | | 9/2005 |
| JP | 2006-221729 A | | 8/2006 |

* cited by examiner

*Primary Examiner* — Jason C Olson
(74) *Attorney, Agent, or Firm* — Birch, Stewart, Kolasch & Birch, LLP

(57) ABSTRACT

A magnetic tape of the present invention includes a plurality of data bands in which a data signal can be recorded and servo pattern portions composed of a burst signal. The servo pattern portions are formed at a predetermined interval in a longitudinal direction of the magnetic tape in a plurality of data bands, and positions of the servo pattern portions formed in the respective data bands in the longitudinal direction of the magnetic tape vary. According to such a configuration, a magnetic tape can be provided, which is traced stably by the magnetic head even if the magnetic tape is deformed due to temperature and humidity.

3 Claims, 12 Drawing Sheets

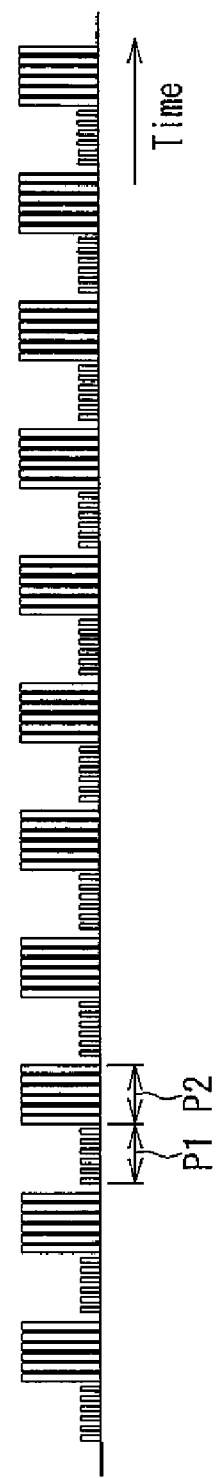

MAGNETIC TAPE ON WHICH A SERVO PATTERN IS FORMED

BACKGROUND OF THE INVENTION

1. Field of the Invention

The present invention relates to a magnetic tape on which at least a servo pattern is formed.

2. Description of Related Art

A magnetic tape finds various applications such as an audio tape, a video tape, and a computer tape. Particularly, in the field of a data backup tape used for data backup in a computer, tapes having a storage capacity of hundreds of Gbytes per volume have been commercialized along with the increase in capacity of a hard disk targeted for backup. In the future, the increase in capacity of a backup tape is indispensable so as to address the further increase in capacity of a hard disk.

Along with the increase in capacity of a magnetic tape, it is necessary to perform high-density recording with respect to a magnetic tape. Examples of the high-density recording include a technique of recording data onto a magnetic tape while shortening a recording wavelength of data (wavelength shortening technique) and a technique of recording data onto a magnetic tape while narrowing a track width in which the data is to be recorded (track narrowing technique).

Furthermore, in order to allow a magnetic head to trace an intended track exactly, a servo signal is recorded previously on a magnetic tape. For example, as shown in FIG. 5A, in a magnetic tape under the Linear Tape Open (LTO) specification, a plurality of data zones 103 are formed in a longitudinal direction of a magnetic tape 101, and servo bands 102 are formed between the respective data zones 103. A data signal can be recorded in the data zones 103, and a servo signal is recorded previously in the servo bands 102 by a servo writer or the like. FIG. 5B is an enlarged view of a Z-portion shown in FIG. 5A. As shown in FIG. 5B, each servo band 102 include a plurality of servo patterns in a substantially truncated chevron shape. According to the LTO specification, one servo frame includes a first servo pattern group 102a composed of 5 servo patterns tilted in a first direction with respect to the longitudinal direction of the magnetic tape 101, a second servo pattern group 102b composed of 5 servo patterns tilted in a second direction opposed to the first direction, a third servo pattern group 102c composed of 4 servo patterns tilted in the first direction, and a fourth servo pattern group 102d composed of 4 servo patterns tilted in the second direction. One servo frame has a length of 200 μm.

When information is reproduced from the magnetic tape 101 by a recording and reproducing apparatus, a data signal recorded in the data zones 103 is read by a data head, and a servo signal recorded in the servo bands 102 is read by a servo head, whereby the data signal can be read while a magnetic head is positioned exactly on an intended track on the magnetic tape 101. When tracking servo is performed, a servo signal in one servo frame is read, and thereafter, the amount of a positioning control of the magnetic head is updated. More specifically, the position of the magnetic head is corrected every time the magnetic tape 101 is allowed to travel by 200 μm.

For example, Patent Document (JP 2005-056500 A) discloses a configuration in which a servo signal is recorded or reproduced magnetically with respect to a magnetic tape.

However, in the configuration shown in FIGS. 5A and 5B, one servo frame has a length of 200 μm, so that there is the following problem: the number of samples of a servo signal per unit time is small, and the traceability of the magnetic head with respect to the magnetic tape is low. In particular, when the magnetic tape is deformed in a width direction due to the influence of temperature and humidity, the traceability of the magnetic head with respect to the magnetic tape decreases largely.

SUMMARY OF THE INVENTION

Therefore, with the foregoing in mind, it is an object of the present invention to provide a magnetic tape that can be traced stably by a magnetic head even if the magnetic tape is deformed due to temperature, humidity, and the like.

A first configuration of a magnetic tape of the present invention includes a data band in which a data signal is capable of being recorded, and a servo band in which servo patterns for performing a servo control are formed, wherein the servo band is formed so that the servo patterns composed of a burst signal are placed continuously in a longitudinal direction of the magnetic tape.

A second configuration of a magnetic tape of the present invention includes a plurality of data bands in which a data signal is capable of being recorded, and servo patterns composed of a burst signal, wherein the servo patterns are formed at a predetermined interval in a longitudinal direction of the magnetic tape in one data band among the plurality of data bands.

A third configuration of a magnetic tape of the present invention includes a plurality of data bands in which a data signal is cap able of being recorded, and servo patterns composed of a burst signal, wherein the servo patterns are formed at a predetermined interval in a longitudinal direction of the magnetic tape in the plurality of data bands, and positions of the servo patterns in the longitudinal direction of the magnetic tape vary depending upon the data band.

A fourth configuration of a magnetic tape includes a plurality of data bands in which a data signal is capable of being recorded, and stripe-shaped servo patterns formed so as to be tilted in a longitudinal direction of the magnetic tape, wherein the servo patterns are formed at a predetermined interval in the longitudinal direction of the magnetic tape in the plurality of data bands, and positions of the servo patterns in the longitudinal direction of the magnetic tape vary depending upon the data band.

The magnetic tape of the present invention can be traced stably by a magnetic head even if the magnetic tape is deformed due to temperature and humidity.

BRIEF DESCRIPTION OF THE DRAWINGS

FIG. 1C is a waveform diagram of the servo signal while off-track occurs.

DETAILED DESCRIPTION OF THE INVENTION

Embodiments

1. Basic Configuration of a Magnetic Tape

Figure 1A:
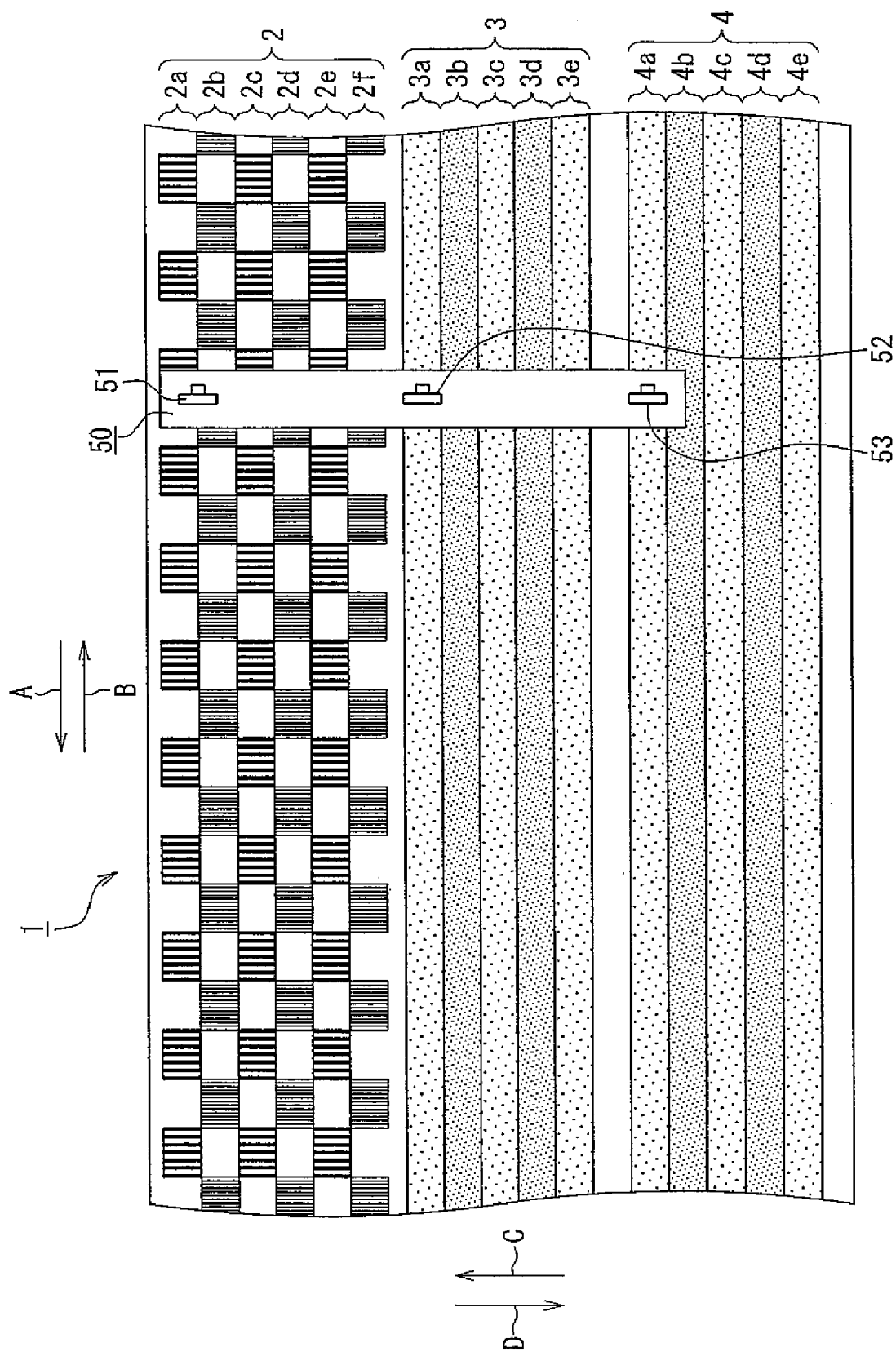
FIG. 1A is a plan view showing a configuration of a magnetic tape in Embodiment 1.

FIG. 1A shows a configuration of a recording surface of a magnetic tape in Embodiment 1. As shown in FIG. 1A, a magnetic tape 1 has a servo band 2 and data bands 3 and 4 in a longitudinal direction. The servo band 2 and the data bands 3 and 4 are formed in parallel with each other. Furthermore, the magnetic tape 1 is allowed to travel in a direction indicated by an arrow A or B, for example, by a recording and reproducing apparatus. Data is recorded onto the magnetic tape of the present embodiment by a recording apparatus or a recording and reproducing apparatus. Furthermore, data recorded on the magnetic tape of the present embodiment is reproduced by a reproducing apparatus or a recording and reproducing apparatus. In the following description, a recording and reproducing apparatus will be illustrated as an example.

Figure 1B:
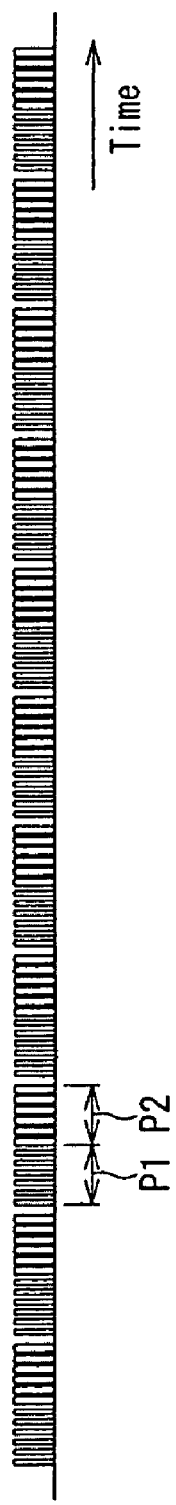
FIG. 1B is a waveform diagram of a servo signal recorded on the magnetic tape in Embodiment 1.

The servo band 2 is formed at an upper end in a width direction of the magnetic tape 1, and is composed of a plurality of servo tracks 2a to 2f. The servo tracks 2a to 2f are formed in parallel with each other in the width direction of the magnetic tape 1. The servo tracks 2a, 2c, 2e respectively are composed of servo patterns formed of a burst signal with the same frequency, and the servo tracks 2b, 2d, 2f respectively are composed of servo patterns formed of a burst signal with the same frequency. The servo tracks 2a, 2c, 2e and the servo tracks 2b, 2d, 2f are composed of servo patterns with different frequencies. Furthermore, the servo patterns constituting the servo tracks 2a to 2f are placed in a staggered arrangement in the longitudinal direction of the magnetic tape 1. When the servo patterns are read by a servo head 51, the servo head 51 traces an intermediate portion between two servo tracks, so that a servo signal obtained from the servo head 51 becomes continuous as shown in FIG. 1B. Thus, it can be understood that the servo patterns are formed continuously in the longitudinal direction of the magnetic tape 1.

The data bands 3 and 4 are regions in which a data signal can be recorded by a magnetic head unit 50. When a data signal is recorded in the data band 3, a plurality of data tracks 3a to 3e are formed. The data tracks 3a to 3e are formed in parallel with each other in the width direction of the magnetic tape 1. Furthermore, when a data signal is recorded in the data band 4, a plurality of data tracks 4a to 4e are formed. The data tracks 4a to 4e are formed in parallel with each other in the width direction of the magnetic tape 1.

In the present embodiment, although five data tracks are formed respectively in the data bands 3 and 4, the number of data bands and the number of data tracks are not limited thereto. Furthermore, although the number of servo tracks is six in the present embodiment, the number of servo tracks is not limited thereto. If the number of data tracks is set to be N per data band, the present embodiment can be realized by setting the number of servo tracks to be (N+1). Furthermore, although the servo band 2 is placed at the upper end in the width direction of the magnetic tape 1, the servo band 2 may be placed at another position such as a position between the data bands 3 and 4.

The magnetic head unit 50 includes the servo head 51 and data heads 52 and 53. The servo head 51 can read the servo patterns 2a to 2f formed in the servo band 2 of the magnetic tape 1. The data head 52 can record a data signal in the data band 3, and also can read a data signal recorded on the data band 3. The data head 53 can record a data signal in the data band 4, and also can read a data signal recorded in the data band 4.

2. Recording and Reproducing Operation

When a data signal is recorded on the magnetic tape 1, the servo head 51, and the data heads 52 and 53 are supplied with a current while the magnetic tape 1 is allowed to travel in the direction indicated by the arrow A or B. Thus, while the servo patterns 2a to 2f are read selectively by the servo head 51 to perform tracking servo, a data signal is recorded in the data band 3 by the data head 52 and a data signal is recorded in the data band 4 by the data head 53.

When a data signal recorded on the magnetic tape 1 is reproduced, the servo head 51 and the data heads 52 and 53 are supplied with a current while the magnetic tape 1 is allowed to travel in the direction indicated by the arrow A or B. Thus, while the servo patterns 2a to 2f are read selectively by the servo head 51 to perform tracking servo, a data signal recorded in the data band 3 is read by the data head 52, and a data signal recorded in the data band 4 is read by the data head 53.

3. Operation of Tracking Servo

When the magnetic head unit 50 performs tracking servo with respect to the magnetic tape 1, first, either of the servo patterns 2a to 2f is read by the servo head 51. For example, when the data head 52 is brought into contact with the data track 3a, and the data head 53 is brought into contact with the data track 4a, the servo head 51 is allowed to trace an intermediate portion between the servo tracks 2a and 2b, thereby reading the servo pattern of the servo track 2a and the servo pattern of the servo track 2b.

FIG. 1B shows a waveform of a servo signal reproduced by the servo head 51. As shown in FIG. 1B, when the servo head 51 traces an intermediate portion between the servo tracks 2a and 2b, the output level of a servo signal P2 reproduced from the servo track 2a becomes substantially the same as that of a servo signal P1 reproduced from the servo track 2b. However, in the case where the magnetic tape 1 is displaced in the width direction (direction indicated by an arrow C or D) due to the LTM, and the relative position between the magnetic head unit 50 and the magnetic tape 1 is displaced, the output level of the servo signal P1 becomes different from that of the servo signal P2. For example, in the case where the magnetic head unit 50 is displaced in the direction indicated by the arrow C from a normal position, as shown in FIG. 1C, the output level of the servo signal P2 reproduced from the servo track 2a becomes high, and the output level of the servo signal P1 reproduced from the servo track 2b becomes low.

On the recording and reproducing apparatus side, an off-track amount is calculated based on the level of the servo signal shown in FIG. 1C, and the magnetic head unit 50 is moved in the width direction of the magnetic tape 1 so that the off-track amount becomes zero.

Thus, tracking servo is performed while the servo patterns 2a and 2b are being read, whereby the data head 52 can be brought into contact with the data track 3a, and the data head 53 can be brought into contact with the data track 4a.

Similarly, in the case where the data head 52 is brought into contact with the data track 3b, and the data head 53 is brought into contact with the data track 4b, the magnetic tape 1 is allowed to travel in the direction indicated by the arrow B, and the servo patterns of the servo tracks 2b and 2c are read by the servo head 51 to perform tracking servo. Tracking servo is performed in the same way as described above even with respect to the data tracks 3c, 3d, 3e, 4c, 4d, and 4e, whereby the data heads 52 and 53 respectively can be brought into contact with the tracks.

4. Effects of an Embodiment, etc.

According to the present embodiment, due to the presence of the servo band 2 in which the servo patterns composed of a burst signal are placed, even if the LTM occurs in the magnetic tape 1, the number of samples of the servo signal per unit time increases since the reading interval of the servo patterns is shorter than that of the conventional example, and consequently the traceability of the magnetic head unit 50 can be enhanced.

Figure 5A:
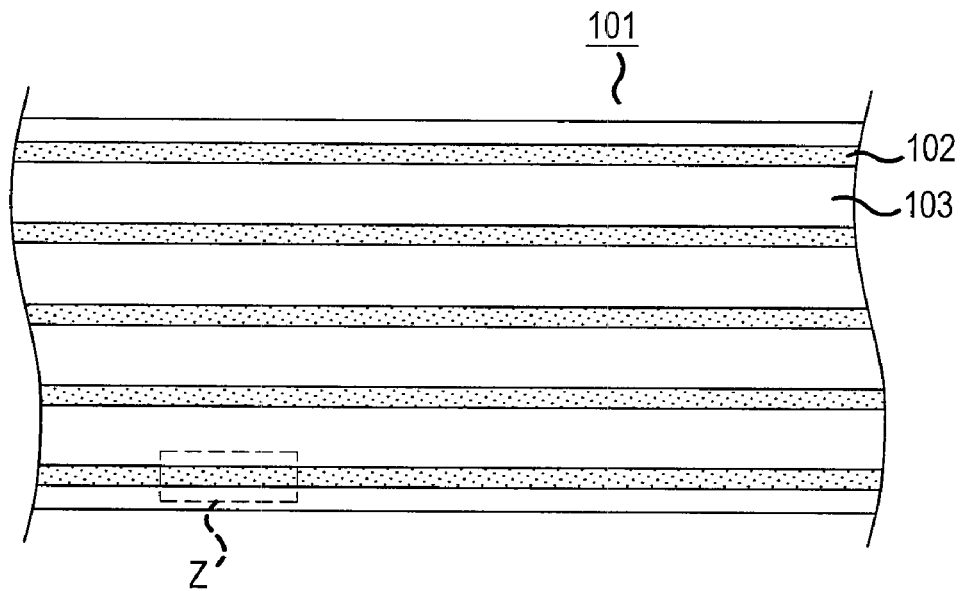
FIG. 5A is a plan view showing a configuration of a conventional magnetic tape.
Figure 5B:
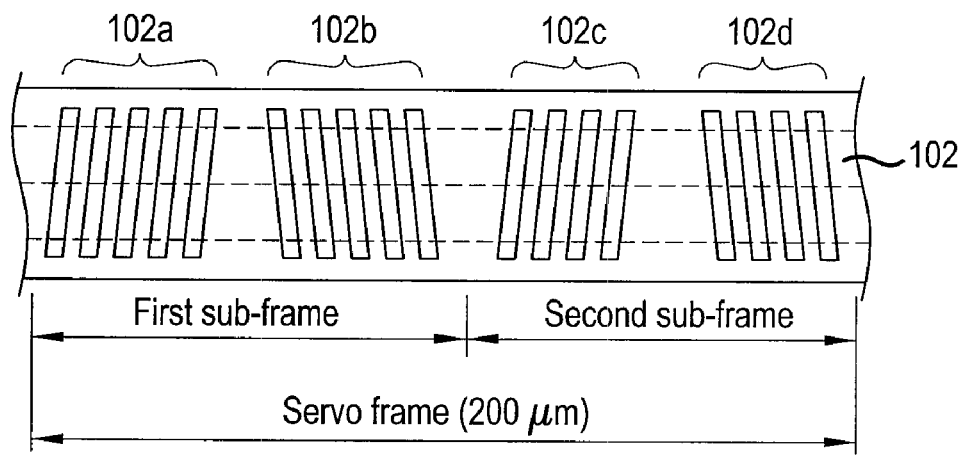
FIG. 5B is a schematic view showing a configuration of a servo pattern in the conventional magnetic tape.

Furthermore, the area in which the servo band 2 occupies with respect to the entire recording region of the magnetic tape 1 in the present embodiment is not substantially different from that of the conventional magnetic tape shown in FIG. 5A. Therefore, the area of a region where a data signal can be recorded does not become smaller than that of the conventional example, and the recordable capacity of a data signal also can be ensured in the same way as in the conventional example.

Embodiment 2

1. Basic Configuration of a Magnetic Tape

Figure 2A:
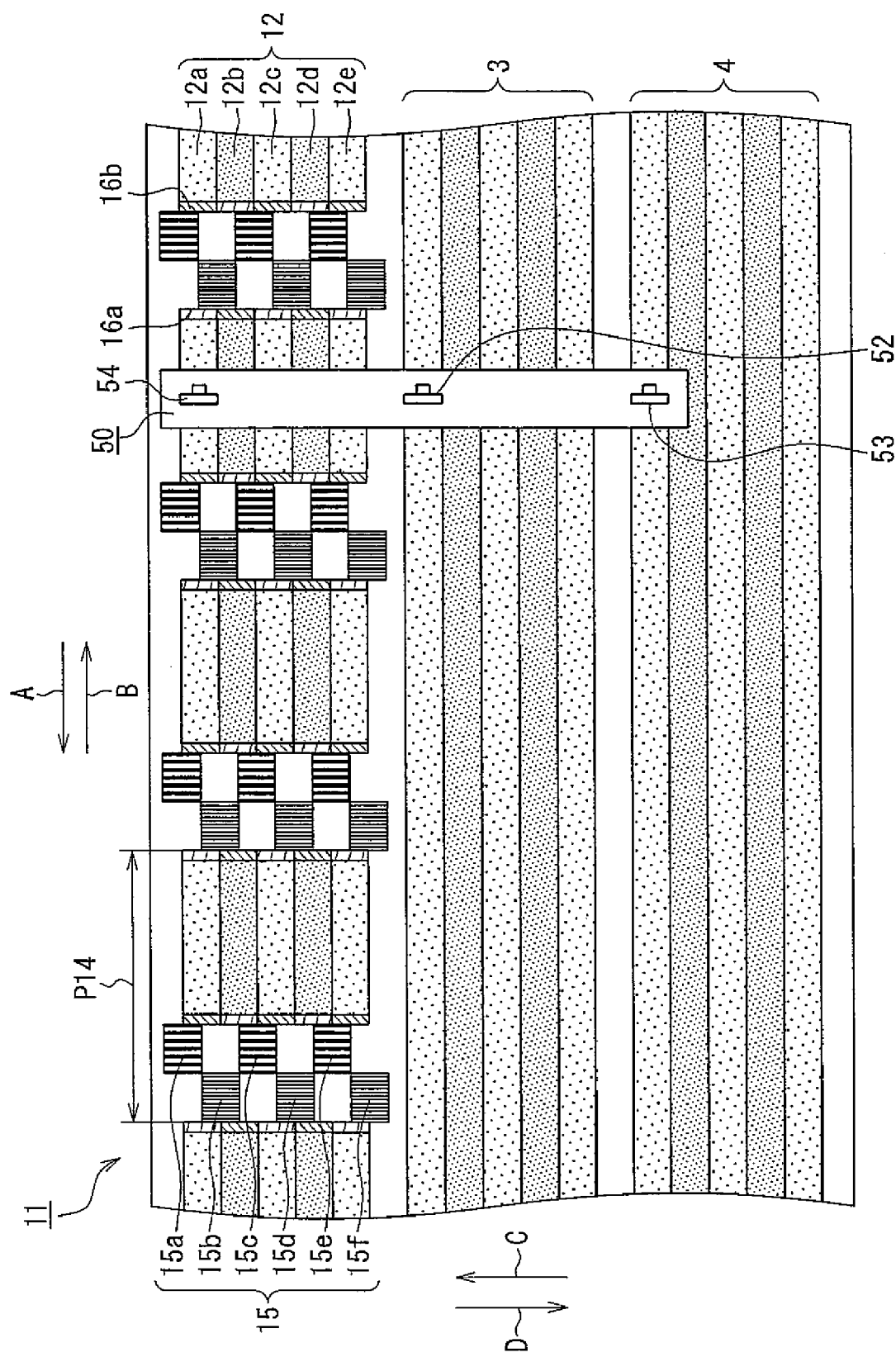
FIG. 2A is a plan view showing a configuration of a magnetic tape in Embodiment 2.

FIG. 2A shows a configuration of a recording surface of a magnetic tape in Embodiment 2. In the configuration shown in FIG. 2A, the same components as those shown in FIG. 1A are denoted with the same reference numerals as those therein, and the description thereof will be omitted.

As shown in FIG. 2A, a magnetic tape 11 has a plurality of data bands 3, 4, and 12 in a longitudinal direction. Furthermore, the magnetic tape 11 is allowed to travel in a direction indicated by an arrow A or B by a recording and reproducing apparatus.

The data band 12 includes data tracks 12a to 12e, servo pattern portions 15, servo marks 16a, and sync marks 16b. The data tracks 12a to 12e are regions where a data signal can be recorded, and five data tracks are formed in the present embodiment. The servo pattern portions 15 are formed at a predetermined interval in the longitudinal direction of the magnetic tape 11, and each of the servo pattern portions 15 is composed of six servo patterns 15a to 15f placed in a staggered arrangement. Furthermore, the servo patterns 15a to 15f are composed of a burst signal. The servo marks 16a and the sync marks 16b are formed before and after each servo pattern portion 15 in the longitudinal direction of the magnetic tape 11. The servo marks 16a contain information indicating the start position of the servo pattern portion 15. The sync marks 16b contain information indicating the start position of the data tracks 12a to 12e. In the present embodiment, the magnetic tape 11 is allowed to reciprocate in the direction indicated by the arrow A or B when a data signal is recorded onto the magnetic tape 11 or a data signal is reproduced therefrom, so that the positions of the servo marks 16a are different from those of the sync marks 16b between the data tracks 12a, 12c, 12e and the data tracks 12b, 12d. As used herein, the "data band" refers to a region where a data signal can be recorded/reproduced with one magnetic head. Furthermore, a region that is interposed between the servo bands and is formed of a plurality of data bands will be referred to as a "data zone".

In the present embodiment, an interval P14 of the servo pattern portions 15 is set to be, for example, 50 µm. Although the data bands 3, 4, and 12 respectively are provided with five data tracks, the number of data bands and the number of data tracks are not limited thereto. Furthermore, although six servo patterns are placed in one servo pattern portion 15, the number of the servo patterns is not limited thereto. If the number of data tracks is set to be N, the present embodiment can be realized by setting the number of servo patterns in one servo pattern portion 15 to be (N+1).

A magnetic head unit 50 includes a magnetic head 54 instead of the servo head 51 shown in FIG. 1A. The magnetic head 54 can read the servo patterns formed on the magnetic tape 11, record a data signal in the data tracks 12a to 12e of the magnetic tape 11, and read a data signal recorded in the data tracks 12a to 12e of the magnetic tape 11.

2. Operation of Tracking Servo

The basic operation of recording and reproducing a data signal in the present embodiment is the same as that in Embodiment 1, so that the description thereof will be omitted, and the operation of tracking servo will be described mainly.

When the magnetic tape 11 is allowed to travel in the direction indicated by the arrow A, and a data signal is being recorded or reproduced with respect to the magnetic tape 11, the magnetic head 54 is tracing a predetermined data track of the data band 12. At this time, when the magnetic head 54 detects the servo mark 16a during tracing, the magnetic head 54 is switched to an operation of reading the servo patterns. Thus, the magnetic head 54 reads the servo patterns following the servo mark 16a. For example, in the case where the magnetic tape 11 is allowed to travel in the direction indicated by the arrow A, and the magnetic head 54 is tracing the data track 12a, the magnetic head 54 reads the servo patterns 15b and 15a.

Figure 2B:
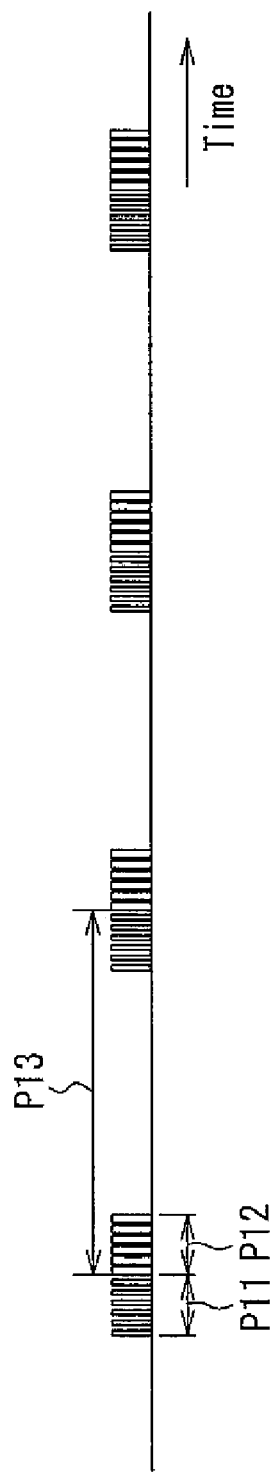
FIG. 2B is a waveform diagram of a servo signal recorded on the magnetic tape in Embodiment 2.

FIG. 2B shows a waveform of a servo signal reproduced based on the servo patterns read by the magnetic head 54. If the magnetic head 54 traces an intermediate portion between the servo patterns 15a and 15b, as shown in FIG. 2B, the output level of the servo signal P11 reproduced from the servo pattern 15b becomes substantially the same as that of the servo pattern P12 reproduced from the servo pattern 15a. However, when the magnetic tape 11 is displaced in the width direction (direction indicated by an arrow C or D) with respect to the magnetic head unit 50 due to the LTM or the like, the output level of the servo signal P11 becomes different from that of the servo signal P12. On the recording and reproducing apparatus side, an off-track amount is calculated based on the output level of the servo signal shown in FIG. 2B, and the magnetic head unit 50 is moved in the width direction of the magnetic tape 11 so that the off-track amount becomes zero. The operation of moving the magnetic head unit 50 in the width direction of the magnetic tape 11 is performed after the off-track amount is calculated. Therefore, the magnetic head unit 50 is moved at a timing when the magnetic head unit 50 is tracing a data track following the read servo pattern portion 15.

When the magnetic head 54 detects the sync mark 16b after reading the servo patterns 15a and 15b, the magnetic head 54 is switched to an operation of recording or reproducing a data signal again. Thus, the magnetic head 54 can record a data signal in the data track 12a or reproduce a data signal recorded in the data track 12a. The data heads 52 and 53 perform the recording operation or the reproducing operation of a data signal continuously irrespective of the switching of the operation state of the magnetic head 54.

Accordingly, the magnetic head 54 reads the servo patterns 15a and 15b to perform tracking servo, whereby the magnetic head unit 50 is allowed to trace a normal position on the magnetic tape 11.

Similarly, in the case where the magnetic head 54 is allowed to trace the data track 12b, the magnetic head unit 50 is moved slightly in a direction indicated by an arrow D, and the magnetic tape 11 is allowed to travel in the direction indicated by the arrow B. When the magnetic head 54 detects the servo mark 16a formed on the data track 12b, the magnetic head 54 is switched to an operation of reproducing a servo signal. Thus, the magnetic head 54 reads the servo patterns 15c and 15b following the servo mark 16a, thereby performing tracking servo. Next, when the magnetic head 54 detects the sync mark 16b, the magnetic head 54 is switched to an operation of recording or reproducing a data signal again to record a data signal in the data track 12b following the sync mark 16b or reproduce a data signal recorded in the data track 12b.

3. Effects of an Embodiment, etc.

According to the present embodiment, the servo pattern portions 15, in which servo patterns formed of a burst signal are placed in a staggered arrangement, are formed at the predetermined interval P14 in the data band 12. Therefore, even if the position of the magnetic tape 11 is displaced in the width direction due to the occurrence of the LTM, the number of samples of the servo signal per unit time increases since the reading interval of the servo signal is shorter than that of the conventional example, and consequently, the traceability of the magnetic head unit 50 with respect to the magnetic tape 11 can be enhanced.

Furthermore, the servo pattern portions 15 are formed at the predetermined interval P14, and a data signal can be recorded between the servo pattern portions 15, whereby the recordable capacity of a data signal in one magnetic tape 11 can be increased.

In the present embodiment, although the interval P14 of the servo pattern portions 15 is set to be 50 µm, this numerical value is an example. Since the magnetic head 54 can increase the number of samples of a servo signal by narrowing the interval P14, tracking servo with traceability enhanced further can be performed. On the other hand, the recordable capacity of a data signal in the data band 12 can be increased by enlarging the interval P14 of the servo pattern portions 15.

Furthermore, it is not necessarily required to form the servo marks 16a and the sync marks 16b. The servo marks 16a and the sync marks 16b are formed so as to detect a border between the data track and the servo pattern. In the case where the frequency of a data signal to be recorded in a data track is different from that of servo patterns, the border can be detected without forming the servo marks 16a and the sync marks 16b.

Embodiment 3

1. Basic Configuration of a Magnetic Tape

Figure 3A:
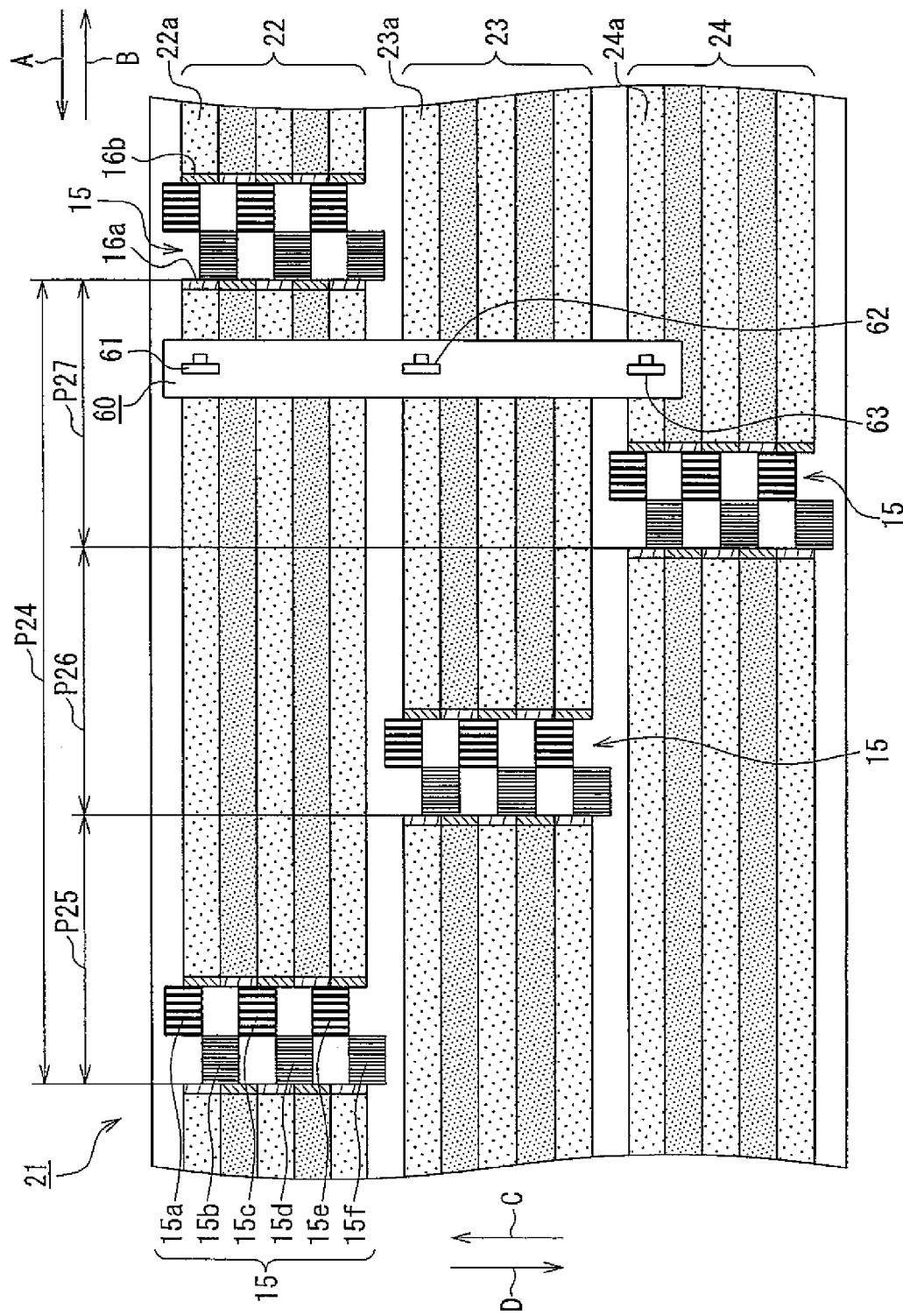
FIG. 3A is a plan view showing a configuration of a magnetic tape in Embodiment 3.

FIG. 3A shows a configuration of a recording surface of a magnetic tape in Embodiment 3. Ea the configuration shown in FIG. 3A, the same components as those shown in FIG. 2A are denoted with the same reference numerals as those therein, and the detailed description thereof will be omitted.

As shown in FIG. 3A, a magnetic tape 21 includes a plurality of data bands 22, 23, and 24 in a longitudinal direction. Furthermore, the magnetic tape 21 is allowed to travel in a direction indicated by an arrow A or B by a recording and reproducing apparatus.

The data band 22 includes a plurality of data tracks (for convenience, only one data track is denoted with a reference numeral 22a), servo pattern portions 15, servo marks 16a, and sync marks 16b. The data tracks are regions where a data signal can be recorded, and five data tracks are formed in the present embodiment. Servo patterns 15a to 15f included in each servo pattern portion 15 are composed of a burst signal. Although reference numerals are omitted in the figure, the data bands 23 and 24 also include data tracks, servo pattern portions 15, servo marks 16a, and sync marks 16b in the same way as in the data band 22.

The present embodiment is characterized by the positions of the servo pattern portions 15. Specifically, each of the data bands 22 to 24 is provided with the servo pattern portions 15 at an interval P24. Furthermore, in the data band 23, the servo pattern portion 15 is formed at a position that is away from the servo pattern portion 15 formed in the data band 22 at a predetermined interval P25 in the longitudinal direction of the magnetic tape 21. Furthermore, in the data band 24, the servo pattern portion 15 is formed at a position that is away from the servo pattern portion 15 formed in the data band 23 at a predetermined interval P26 in the longitudinal direction of the magnetic tape 21. Furthermore, in the data band 22, the servo pattern portion 15 is formed at a position that is away from the servo pattern portion 15 formed in the data band 24 at a predetermined interval P27 in the longitudinal direction of the magnetic tape 21. More specifically, the data bands 22 to 24 respectively are provided with the servo pattern portions 15 at the interval P24, and the positions thereof are shifted from each other in the longitudinal direction of the magnetic tape 21. The servo pattern portions 15 are formed so that the intervals P25, P26, and P27 have the same value, and the sum thereof is matched with the interval P24. In the present embodiment, the intervals P25, P26, and P27 respectively are set to be 50 µm.

In the present embodiment, the data bands 22, 23, and 24 respectively are provided with five data tracks. However, the number of data bands and the number of data tracks are not limited thereto. Furthermore, although the number of servo patterns in one servo pattern portion 15 is set to be six, the number of servo patterns is not limited thereto. If the number of data tracks is N, the present embodiment can be realized by setting the number of servo patterns in one servo pattern portion 15 to be (N+1).

A magnetic head unit 60 includes three magnetic heads 61, 62, and 63. The magnetic heads 61, 62, and 63 respectively can read the servo patterns, record a data signal in a data track, and read a data signal recorded in the data track.

2. Operation of Tracking Servo

The basic operation of recording and reproducing a data signal in the present embodiment is the same as that in Embodiment 1 or 2, so that the description thereof will be omitted and the operation of tracking servo will be described mainly.

When a data signal is being recorded or reproduced with respect to the magnetic tape 21, a magnetic head 61 is tracing a predetermined track of the data band 22, a magnetic head 62 is tracing a predetermined track of the data band 23, and a magnetic head 63 is tracing a predetermined track of the data band 24. The following description will be made assuming that the magnetic heads 61 to 63 are tracing data tracks 22a to 24a in the uppermost stages in the respective data bands 22 to 24.

When the magnetic head 61 detects the servo mark 16a while tracing the data track 22a when the magnetic tape 21 is allowed to travel in the direction indicated by the arrow A, the magnetic head 61 is switched to an operation of reading servo patterns. Thus, the magnetic head 61 reads the servo patterns 15*b* and 15*a* following the servo mark 16*a*.

Figure 3B:
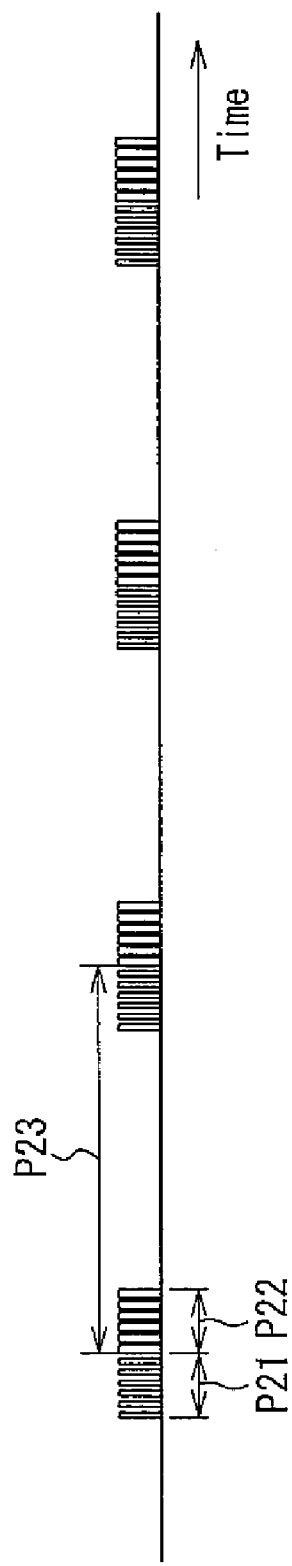
FIG. 3B is a waveform diagram of a servo signal recorded on the magnetic tape in Embodiment 3.

FIG. 3B shows a waveform of a servo signal reproduced based on the servo patterns read by the magnetic head 61. As shown in FIG. 3B, when the servo head 61 traces an intermediate portion between the servo patterns 15*b* and 15*a*, the output level of a servo signal P21 reproduced from the servo pattern 15*b* becomes substantially the same as that of a servo signal P22 reproduced from the servo pattern 15*a*. However, in the case where the magnetic tape 21 is displaced in the width direction (direction indicated by an arrow C or D) with respect to the magnetic head unit 60 due to the LTM, or the magnetic tape 21 is deformed in the width direction due to temperature and humidity expansion, the output level of the servo signal P21 becomes different from that of the servo signal P22. On the recording and reproducing apparatus side, an off-track amount is calculated based on the level of the servo signal shown in FIG. 3B, and the magnetic head unit 60 is moved in the width direction of the magnetic tape 21 so that the off-track amount becomes zero. The operation of moving the magnetic head unit 60 in the width direction of the magnetic tape 21 is performed after the off-track amount is calculated. Therefore, the magnetic head unit 60 is moved at a timing when the magnetic head unit 60 is tracing a data track following the read servo pattern portion 15.

When the magnetic head 61 detects the sync mark 16*b* after reading the servo patterns 15*a* and 15*b*, the magnetic head 61 is switched to an operation of recording or reproducing a data signal again.

Next, when the magnetic head 62 detects the servo mark 16*a* formed in the data track 23*a* after the magnetic tape 21 is allowed to travel by a predetermined distance, the magnetic head 62 is switched to an operation of reading servo patterns. Thus, the magnetic head 62 reads the servo patterns 15*b* and 15*a* following the servo mark 16*a* formed in the data band 23. On the recording and reproducing apparatus side, an off-track amount is calculated by a servo signal based on the servo patterns 15*a* and 15*b* formed in the data band 23, and the magnetic head unit 60 is moved in the width direction of the magnetic tape 21 so that the off-track amount becomes zero.

Furthermore, when the magnetic head 63 detects the servo mark 16*a* formed in the data track 24*a* after the magnetic tape 21 is allowed to travel by a predetermined distance, the magnetic head 63 is switched to an operation of reading servo patterns. Thus, the magnetic head 63 reads the servo patterns 15*b* and 15*a* following the servo mark 16*a* formed in the data band 24. On the recording and reproducing apparatus side, an off-track amount is calculated by a servo signal based on the servo patterns 15*b* and 15*a* formed in the data band 24, and the magnetic head unit 60 is moved in the width direction of the magnetic tape 21 so that the off-track amount becomes zero.

Tracking servo can be performed with the servo signal being read at every predetermined time (50 µm in the present embodiment) by repeating the above operation.

Figure 3C:
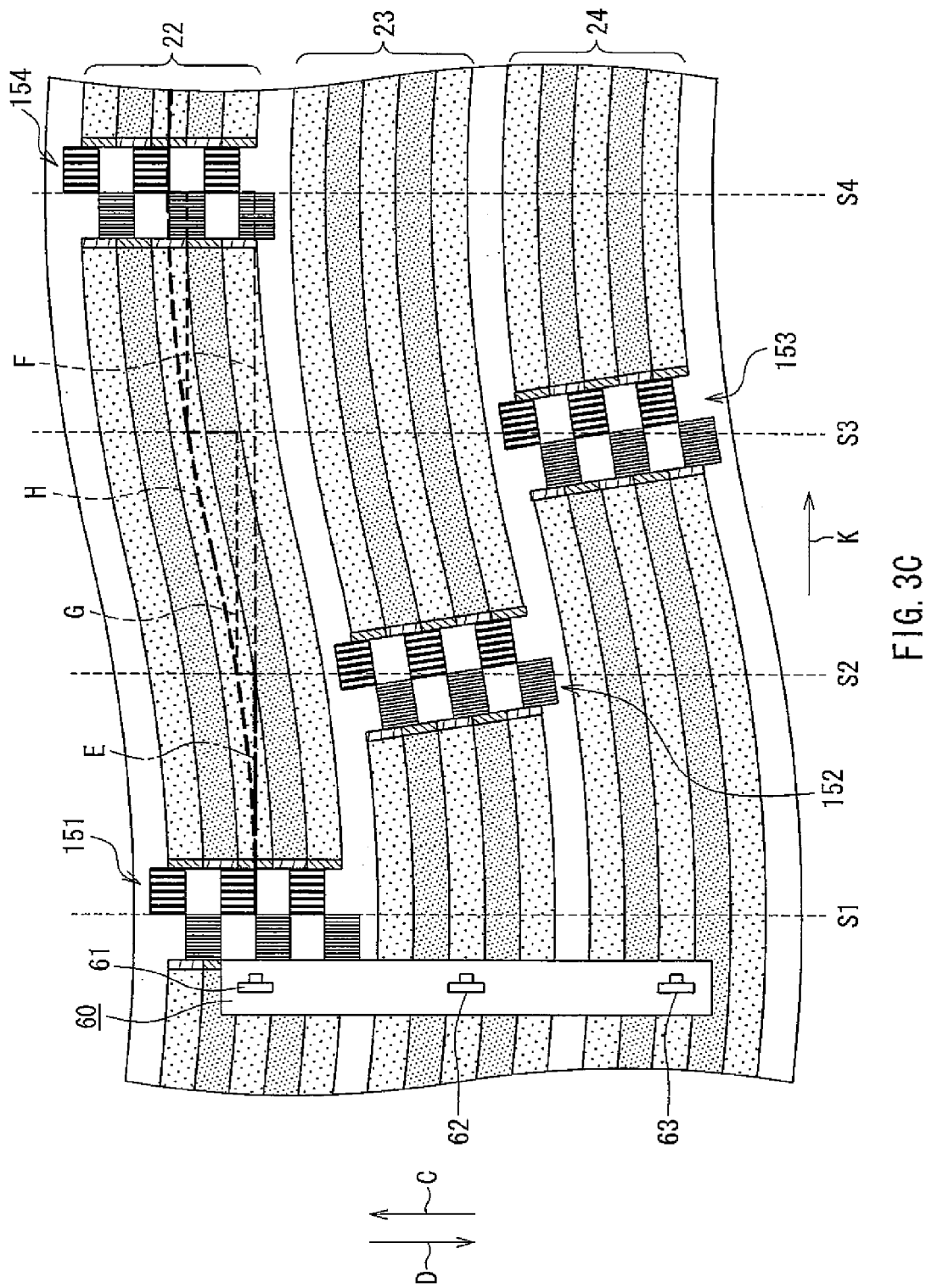
FIG. 3C is a view illustrating tracking servo of the magnetic tape in which a lateral tape motion (LTM) occurs in Embodiment 3.

FIG. 3C is a view illustrating the operation of tracking servo with respect to the magnetic tape 21 deformed in a meandering manner. For convenience of description, the operation will be described with reference to FIG. 3C assuming that the magnetic head unit 60 moves in a direction indicated by an arrow K. In FIG. 3C, alternate long and short dashed lines E and broken lines F, G, H respectively represent movement paths of the magnetic head unit 60 (the magnetic head 61) on the magnetic tape 21.

First, when the magnetic head unit 60 moves from the position shown in FIG. 3C to a position S1 in the direction indicated by the arrow K, the magnetic head 61 reads servo patterns of a servo pattern portion 151 formed in the data band 22, thereby performing tracking servo. At this time, the magnetic head unit 60 is tracing a normal position, so that the movement operation of the magnetic head unit 60 by tracking servo in the direction indicated by the arrow C or D does not occur. Thus, the magnetic head unit 60 moves on the long and short dashed lines E.

Next, when the magnetic head unit 60 moves to a position S2, the magnetic head 62 reads servo patterns of a servo pattern portion 152 formed in the data band 23, thereby performing tracking servo. At the position S2, the LTM occurs in the magnetic tape 21, so that the magnetic tape 21 is displaced in the direction indicated by the arrow C from a normal position. Thus, off-track occurs between the magnetic head unit 60 and the magnetic tape 21. The magnetic head unit 60 is moved in the direction indicated by the arrow C based on an off-track amount calculated on the recording and reproducing apparatus side. Although the magnetic head unit 60 theoretically takes a movement path indicated by the broken line G after the position S2, the magnetic head unit 60 actually is moved in the direction indicated by the arrow C at a low speed, so that the magnetic head unit 60 follows the movement path indicated by the broken line H.

Next, when the magnetic head unit 60 moves to a position S3, the magnetic head 63 reads servo patterns of a servo pattern portion 153 formed in the data band 24, thereby performing tracking servo. The position S3 is displaced further in the direction indicated by the arrow C from the position S2 due to the LTM occurring on the magnetic tape 21. The magnetic head unit 60 is moved in the direction indicated by the arrow C based on the off-track amount calculated on the recording and reproducing apparatus side.

Next, when the magnetic head unit 60 moves to a position S4, the magnetic head 61 reads servo patterns of a servo pattern portion 154 formed in the data band 22, thereby performing tracking servo. The position S4 is displaced further in the direction indicated by the arrow C from the position S3 due to the LTM occurring on the magnetic tape 21. The magnetic head unit 60 is moved in the direction indicated by the arrow C based on the off-track amount calculated on the recording and reproducing apparatus side.

Herein, in the case where the interval of the servo pattern portions is large as in the conventional magnetic tape (for example, in the case where tracking servo is performed only with the servo patterns formed in the data band 22), the magnetic head unit 60 moves on the broken line F, so that the traceability with respect to the magnetic tape is low. In particular, the off-track amount becomes maximum between the positions S3 and S4, and there is a high possibility that a writing error and a reading error of a data signal may be caused. In contrast, in the magnetic tape of the present embodiment, since the respective intervals of the positions S1 to S4 are small, so that the magnetic head unit 60 can be moved on the broken line H, and the traceability with respect to the magnetic tape 21 can be enhanced. Thus, a writing error and a reading error of a data signal, etc. will not be caused.

3. Effects of an Embodiment, etc.

In the present embodiment, the servo pattern portions 15 composed of a burst signal are provided in the data band 22 intermittently in the longitudinal direction of the magnetic tape 21. Therefore, even if the position of the magnetic tape 21 is displaced in the width direction due to the occurrence of the LTM, the number of samples of a servo signal per unit time increases since the reading interval of the servo signal is shorter than that of the conventional example, and consequently the traceability of the magnetic head unit 60 with respect to the magnetic tape 21 can be enhanced.

Furthermore, in the case where the servo pattern portions 15 are formed so as to be distributed on all the data bands on the magnetic tape 21, whereby the size of the magnetic tape 21 in the width direction, for example, changes due to the influence of temperature and humidity, a servo output to be reproduced is changed by the magnetic head. For example, based on the magnetic head 61, the servo output in FIG. 3B is as follows.

Servo output of the magnetic head 61: P21=P22
Servo output of the magnetic head 62: P21>P22
Servo output of the magnetic head 63: P21>>P22

In the case where such a change in a servo output is detected, the recording and reproduction of a data signal is stopped, or a conventional method for recording and reproducing a data signal simultaneously with a plurality of magnetic heads is switched to a method for recording and reproducing data, using only one magnetic head, whereby an error during recording and reproduction can be prevented.

Furthermore, the servo pattern portions 15 are formed at the predetermined interval P24 in each of the data bands 22 to 24 so that a data signal can be recorded between the servo pattern portions 15, whereby the recordable capacity of a data signal in one magnetic tape 21 can be increased. For example, each of P25 to P27 shown in FIG. 3A has the same size as that of P14 shown in FIG. 2A, so that the recordable capacity in the present embodiment is the same as that in Embodiment 2.

In the present embodiment, although each of the intervals P25 to P27 of the servo pattern portions 15 is set to be 50 μm, the numerical value is an example. The number of samples of a servo signal to be read can be increased by narrowing the intervals P25 to P27 respectively, so that tracking servo with traceability enhanced further can be performed. On the other hand, by enlarging the intervals P25 to P27 of the servo pattern portions 15, the larger recordable capacity of a data signal in the data bands 22 to 24 can be ensured.

Furthermore, it is not necessarily required to form the servo marks 16a and the sync marks 16b. The servo marks 16a and the sync marks 16b are formed so as to detect the border between the data track and the servo pattern. In the case where the frequency of a data signal to be recorded in a data track is different from that of servo patterns, the border can be detected even without forming the servo marks 16a and the sync marks 16b.

Furthermore, in the present embodiment, although the servo patterns are formed in all the data bands, it is not necessarily required to form the servo patterns in all the data bands. For example, in the case of a magnetic tape having 16 data bands, even in the configuration in which the servo patterns are formed only in either data bands in odd rows or data bands in even rows, the effects similar to those of the present embodiment can be obtained.

Furthermore, in the present embodiment, although the intervals P25 to P27 of the servo pattern portions 15 are set to be uniform, tracking servo can be performed similarly even if the intervals P25 to P27 are non-uniform.

Embodiment 4

1. Basic Configuration of a Magnetic Tape

Figure 4A:
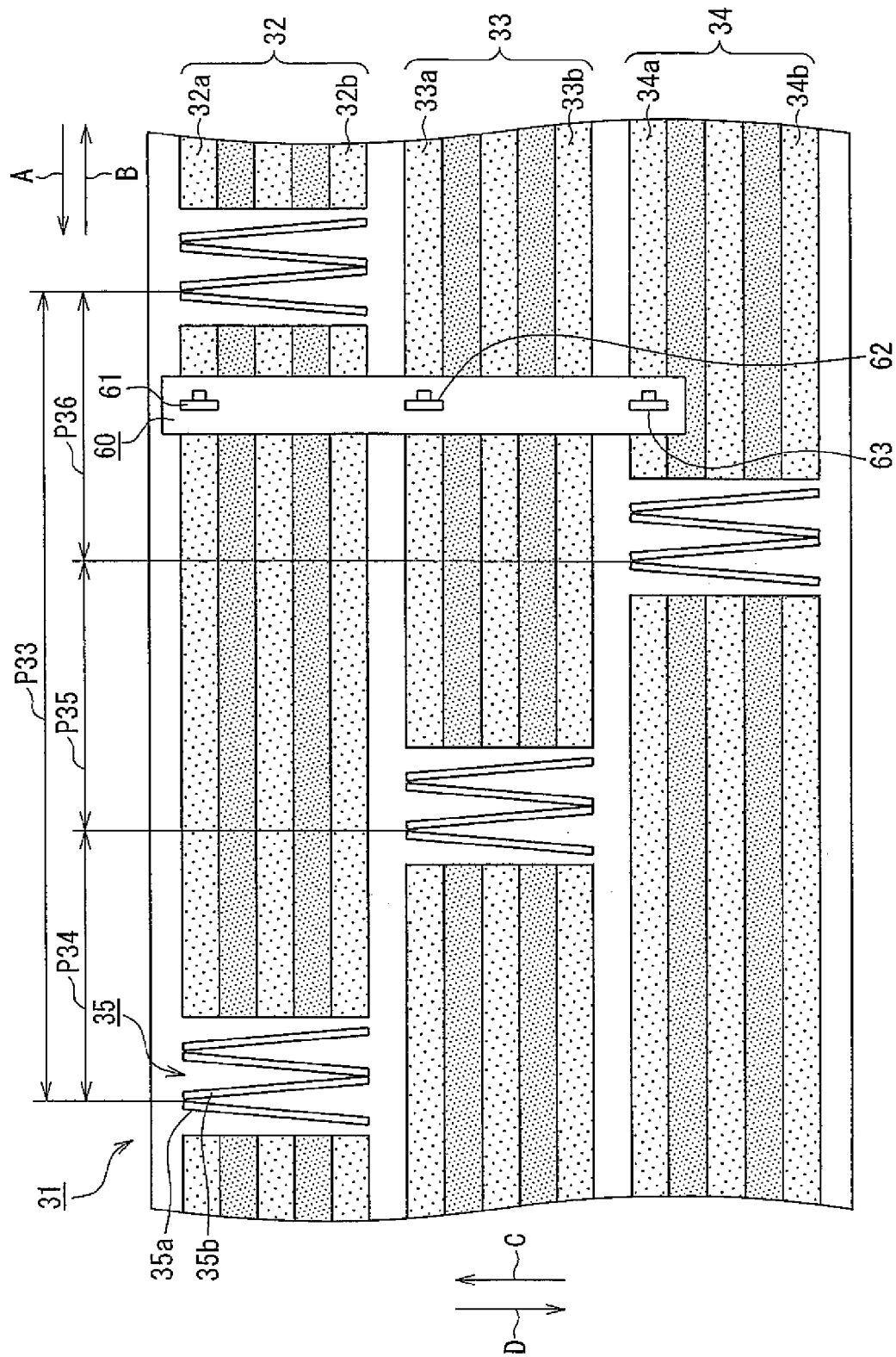
FIG. 4A is a plan view showing a configuration of a magnetic tape in Embodiment 4.

FIG. 4A shows a configuration of a magnetic tape in the present embodiment. In FIG. 4A, the same components as those shown in FIG. 3A are denoted with the same reference numerals as those therein, and the detailed description thereof will be omitted. As shown in FIG. 4A, a magnetic tape 31 includes a plurality of data bands 32, 33, 34 in a longitudinal direction. Furthermore, the magnetic tape 31 is allowed to travel in a direction indicated by an arrow A or B by a recording and reproducing apparatus.

In the data band 32, a plurality of data tracks and servo pattern portions 35 are formed. The data tracks are regions where a data signal can be recorded, and in the present embodiment, one data band has five data tracks. For convenience of description, only the data tracks at upper and lower ends in the data bands 32, 33, 34 are denoted with reference numerals 32a, 32b, 33a, 33b, 34a, and 34b.

The servo pattern portions 35 are formed at predetermined positions in the data bands 32 to 34, and include servo patterns 35a and 35b. The servo patterns 35a and 35b are formed in a stripe-shape pattern tilted in a longitudinal direction and in a substantially truncated chevron shape. In the present embodiment, as shown, although four servo patterns are provided in one servo pattern portion 35, this is merely an example. Furthermore, the servo pattern portions 35 are formed at an interval P33 in each of the data bands 32 to 34. Furthermore, in the data band 33, the servo pattern portion 35 is formed at a position that is away from the servo pattern portion 35 formed in the data band 32 at a predetermined interval P34 in the longitudinal direction of the magnetic tape 31. Furthermore, in the data band 34, the servo pattern portion 35 is formed at a position that is away from the servo pattern portion 35 formed in the data band 33 at a predetermined interval P35 in the longitudinal direction of the magnetic tape 31. Furthermore, in the data band 32, the servo pattern portion 35 is formed at a position that is away from the servo pattern portion 35 formed in the data band 34 at a predetermined interval P36 in the longitudinal direction of the magnetic tape 31. More specifically, in each of the data bands 32 to 34, the servo pattern portions 35 are formed at the interval P33, and the positions thereof are shifted from each other in the longitudinal direction of the magnetic tape 31. The servo pattern portions 35 are formed so that the intervals P34, P35, and P36 have the same value and the sum thereof is matched with the interval P33. In the present embodiment the intervals P34, P35, and P36 respectively are set to be 50 μm. Furthermore, although the servo marks and the sync marks as shown in FIG. 3A are formed before and after each servo pattern portion 35, for convenience of the description, the servo marks and the sync marks are not shown in FIG. 4A.

In the present embodiment, although the data bands 32, 33, and 34 respectively are provided with five data tracks, the number of data bands and the number of data tracks are not limited thereto.

2. Operation of Tracking Servo

The basic operation of recording and reproducing a data signal in the present embodiment is the same as that in Embodiment 1, 2, or 3, so that the description thereof will be omitted and the operation of tracking servo will be described mainly.

When a data signal is being recorded or reproduced with respect to the magnetic tape 31, the magnetic head 61 is tracing a predetermined track of the data band 32, the magnetic head 62 is tracing a predetermined track of the data band 33, and the magnetic head 63 is tracing a predetermined track of the data band 34. The following description will be made assuming that the magnetic heads 61 to 63 are tracing the data tracks in the uppermost stages in each of the data bands 32 to 34.

When the magnetic head 61 detects a servo mark (see FIG. 3A, etc.) while tracing the data track 32a when the magnetic tape 31 is allowed to travel in the direction indicated by the arrow A, the magnetic head 61 is switched to an operation of reading servo patterns. Thus, the magnetic head 61 reads the servo patterns 35a and 35b following the servo mark.

Figure 4B:
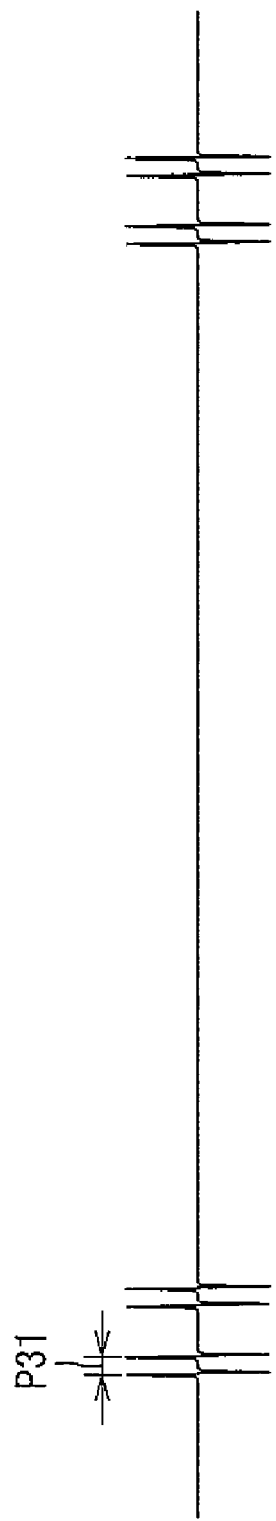
FIG. 4B is a waveform diagram of a servo signal recorded on the magnetic tape in Embodiment 4.
Figure 4C:
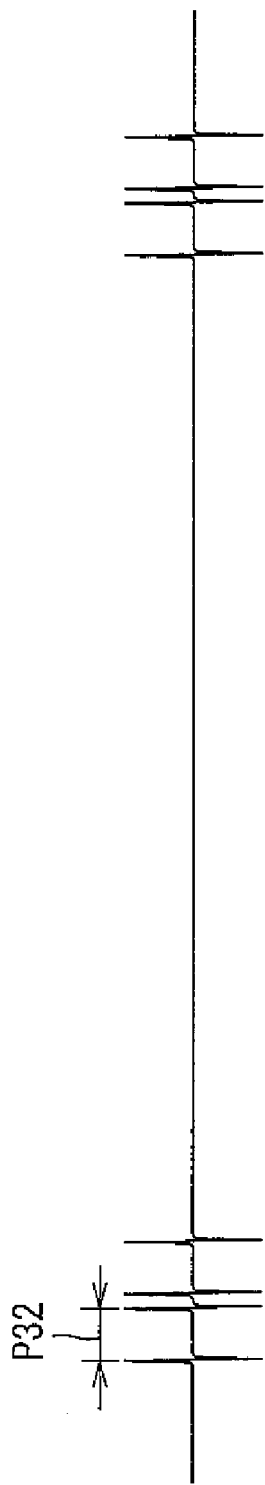
FIG. 4C is a waveform diagram of the servo signal recorded on the magnetic tape in Embodiment 4.

FIG. 4B shows a waveform of a servo signal reproduced while the magnetic head 61 traces the data track 32a. FIG. 4C shows a waveform of a servo signal reproduced while the magnetic head 61 traces the data track 32b.

When the magnetic head 61 traces the center in the width direction of the data track 32a, a servo signal to be reproduced has a peak interval P31 shown in FIG. 4B. Based on the detection of the servo signal of the peak interval P31, it can be detected that the magnetic head 61 traces the data track 32a. On the other hand, if the magnetic head 61 traces the center in the width direction of the data track 32b, a servo signal to be reproduced has a peak interval P32 shown in FIG. 4C. Based on the detection of the servo signal of the peak interval P32, it can be detected that the magnetic head 61 traces the data track 32b. More specifically, the servo patterns 35a and 35b are formed in a substantially truncated chevron shape, so that the peak interval of the servo signal to be obtained when each data track of the data band 32 is traced varies depending upon the data track. On the recording and reproducing apparatus side, a data track that is being currently traced by the magnetic head 61 can be specified based on the peak interval of the servo signal.

Furthermore, in the case where the magnetic tape 31 is displaced in the width direction (direction indicated by an arrow C or D) with respect to the magnetic head unit 60 due to the LTM or the like, and is deformed in the width direction due to temperature and humidity expansion, the relative position in the tape width direction between the magnetic head 61, and the servo patterns 35a and 35b is displaced, so that the peak interval of a servo signal to be reproduced changes. For example, if the magnetic tape 31 is displaced in the direction indicated by the arrow D while the magnetic head 61 is tracing the data track 32a, the peak interval of a servo signal to be obtained from the magnetic head 61 becomes smaller than the peak interval P31. On the other hand, in the case where the magnetic tape 31 is displaced in the direction indicated by the arrow C, the peak interval of a servo signal to be obtained from the magnetic head 61 becomes larger than the peak interval P31. On the recording and reproducing apparatus side, an off-track amount is calculated based on such a change in a peak interval of a servo signal, and the magnetic head unit 60 is moved in the direction indicated by the arrow C or D so that the off-track amount becomes zero. Because of this, the magnetic heads 61, 62, and 63 can trace predetermined data tracks.

When the magnetic head 61 detects a sync mark (see FIG. 3A, etc.) after reading the servo pattern portion 35, the magnetic head 61 is switched to an operation of recording or reproducing a data signal again.

Next, the magnetic head 62 reads the servo patterns 35a and 35b formed in the data band 33 after the magnetic tape 31 is allowed to travel by a predetermined distance (corresponding to the interval P34). On the recording and reproducing apparatus side, an off-track amount is calculated with a servo signal based on the servo patterns 35a and 35b formed in the data band 33, and the magnetic head unit 60 is moved in the width direction of the magnetic tape 31 so that the off-track amount becomes zero.

Furthermore, after the magnetic tape 31 is allowed to travel by a predetermined distance (corresponding to the interval P35), the magnetic head 63 reads the servo patterns 35a and 35b formed in the data band 34. On the recording and reproducing apparatus side, an off-track amount is calculated with a servo signal based on the servo patterns 35a and 35b formed in the data band 34, and the magnetic head unit 60 is moved in the width direction of the magnetic tape 31 so that the off-track amount becomes zero.

Tracking servo can be performed with a servo signal being read at every predetermined time (50 µm in the present embodiment) by repeating the above operation.

3. Effects of an Embodiment, etc.

According to the present embodiment, the servo pattern portions 35 composed of a servo signal in a time base servo system are provided in the data band 32 intermittently in the longitudinal direction of the magnetic tape 31. Therefore, even if the position of the magnetic tape 31 is displaced in the width direction due to the occurrence of the LTM, the number of samples of a servo signal per unit time increases since the reading interval of the servo signal is shorter than that of the conventional example, and consequently, the traceability of the magnetic head unit 60 with respect to the magnetic tape 31 can be enhanced.

Furthermore, according to the present embodiment, even if the output level of a servo signal of the magnetic tape 31 decreases, stable tracking servo can be performed in which a servo error is unlikely to occur. More specifically, in a magnetic tape, the output level of a servo signal is likely to change mainly due to the fluctuation in a thickness of a magnetic layer. However, only the presence/absence of an output waveform of a servo signal is detected as in the present embodiment, whereby a servo error is unlikely to occur even if the output level of a servo signal decreases.

Furthermore, the servo pattern portions 35 are formed so as to be distributed on all the data bands on the magnetic tape 31. Thus, for example, in the case where the size in the width direction of the magnetic tape 31 changes due to the influence of temperature and humidity, the servo output to be reproduced is changed by the magnetic head. For example, assuming that a peak interval (corresponding to P31 in FIG. 4B) of a servo signal to be obtained from the magnetic head 61 is P31A, a peak interval of a servo signal to be obtained from the magnetic head 62 is P31B, and a peak interval of a servo signal to be obtained from the magnetic head 63 is P31C, the peak interval of a servo signal to be obtained from each magnetic head is considered as follows, based on the magnetic head 61.

P31A<P31B<P31C

In the case where such a change in a peak interval of a servo signal is detected, the recording and reproduction of a data signal is stopped, or a conventional method for recording and reproducing a data signal simultaneously with a plurality of magnetic heads is switched to a method for recording and reproducing data, using only one magnetic head, whereby an error during recording and reproduction can be prevented.

In the present embodiment, although the intervals P34 to P36 of the servo pattern portions 35 respectively are set to be 50 µm, this numerical value is an example. Since the number of samples of a servo signal to be read can be increased by narrowing the intervals P34 to P36, respectively, tracking servo with traceability enhanced further can be performed. On the other hand, the larger recordable capacity of a data signal in the data bands 32 to 34 can be ensured by enlarging the intervals P34 to P36 of the servo pattern portions 35.

Furthermore, in the present embodiment, although the servo patterns are formed in all the data bands, it is not necessarily required to form the servo patterns in all the data bands. For example, in the case of a magnetic tape having 16 data bands, even in the configuration in which the servo patterns are formed only in either data bands in odd rows or data bands in even rows, the effects similar to those of the present embodiment can be obtained.

The magnetic tape of the present invention is useful for a magnetic tape on which a servo pattern is formed.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape, comprising:
a data band in which a data signal is capable of being recorded; and
a servo band in which a plurality of servo tracks including servo patterns for performing a servo control are formed,
wherein the servo band is formed so that the servo patterns are composed of a burst signal and are placed continuously in a longitudinal direction of the magnetic tape, and
assuming that the number of a plurality of data tracks is N per data band, the number of the plurality of servo tracks is N+1.

2. A magnetic tape, comprising:
a plurality of data bands in which a data signal is capable of being recorded; and
servo patterns composed of a burst signal,
wherein the servo patterns are formed at a predetermined interval in a longitudinal direction of the magnetic tape in the plurality of data bands, and
positions of the servo patterns in the longitudinal direction of the magnetic tape vary depending upon the data band, and
the servo patterns are formed so as not to be adjacent to each other between the respective data bands.

3. A magnetic tape, comprising:
a plurality of data bands in which a data signal is capable of being recorded; and
stripe-shaped servo patterns formed so as to be tilted in a longitudinal direction of the magnetic tape,
wherein the servo patterns are formed at a predetermined interval in the longitudinal direction of the magnetic tape in the plurality of data bands,
positions of the servo patterns in the longitudinal direction of the magnetic tape vary depending upon the data band, and
the servo patterns are formed so as not to be adjacent to each other between the respective data bands.

* * * * *